United States Patent
Jiao et al.

(10) Patent No.: US 9,723,478 B2
(45) Date of Patent: Aug. 1, 2017

(54) UE CONFIGURATION METHOD, NETWORK SIDE DEVICE AND SYSTEM FOR PROXIMITY AWARENESS

(71) Applicant: China Academy of Telecommunications Technology, Beijing (CN)

(72) Inventors: Bin Jiao, Beijing (CN); Ying Wang, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 277 days.

(21) Appl. No.: 14/412,689

(22) PCT Filed: Jul. 5, 2013

(86) PCT No.: PCT/CN2013/078906
§ 371 (c)(1),
(2) Date: Jan. 5, 2015

(87) PCT Pub. No.: WO2014/005551
PCT Pub. Date: Jan. 9, 2014

(65) Prior Publication Data
US 2015/0148024 A1 May 28, 2015

(30) Foreign Application Priority Data
Jul. 6, 2012 (CN) .......................... 2012 1 0234916

(51) Int. Cl.
*H04W 76/00* (2009.01)
*H04W 8/22* (2009.01)
(Continued)

(52) U.S. Cl.
CPC ............ *H04W 8/22* (2013.01); *H04W 8/205* (2013.01); *H04W 76/00* (2013.01); *H04W 8/005* (2013.01)

(58) Field of Classification Search
None
See application file for complete search history.

(56) References Cited

U.S. PATENT DOCUMENTS

2010/0009675 A1   1/2010   Wijting et al.
2010/0268775 A1  10/2010   Doppler et al.
(Continued)

FOREIGN PATENT DOCUMENTS

CN    102271382 A    12/2011
CN    102395160 A     3/2012
(Continued)

OTHER PUBLICATIONS

European Search Report for EP 13 81 3443 mailed Jun. 17, 2016, 7 pages.
(Continued)

*Primary Examiner* — Diane Mizrahi
(74) *Attorney, Agent, or Firm* — Kilpatrick Townsend & Stockton LLP

(57) ABSTRACT

Disclosed are a UE configuration method, network side device and system for proximity awareness in the present invention, which are used to achieve the function of obtaining the service information by proximity awareness between terminals in a cellular communication system. The network side device configures the service ID of each service type to be sent by the transmission UE and the temporary device ID, and the network side device configures the service ID filtering template for the receiving UE according to the service types to be received by the receiving UE, and thus
(Continued)

the configured transmission UE and the receiving UE can obtain the service information by proximity awareness.

20 Claims, 9 Drawing Sheets

(51) Int. Cl.
*H04W 8/20* (2009.01)
*H04W 8/00* (2009.01)

(56) References Cited

U.S. PATENT DOCUMENTS

| | | | |
|---|---|---|---|
| 2011/0268006 A1 | 11/2011 | Koskela et al. | |
| 2012/0264443 A1* | 10/2012 | Ng | H04W 4/005 |
| | | | 455/450 |
| 2013/0287012 A1* | 10/2013 | Pragada | H04W 76/045 |
| | | | 370/338 |
| 2013/0288668 A1* | 10/2013 | Pragada | H04W 12/06 |
| | | | 455/426.1 |
| 2014/0342735 A1* | 11/2014 | Liao | H04W 8/04 |
| | | | 455/435.1 |
| 2015/0142986 A1* | 5/2015 | Reznik | H04L 67/16 |
| | | | 709/228 |
| 2015/0148024 A1* | 5/2015 | Jiao | H04W 76/00 |
| | | | 455/418 |
| 2016/0150392 A1* | 5/2016 | Jung | H04W 8/005 |
| | | | 455/450 |
| 2016/0150498 A1* | 5/2016 | Liao | H04W 8/04 |
| | | | 455/422.1 |
| 2016/0227471 A1* | 8/2016 | De Foy | H04W 4/001 |
| 2016/0249336 A1* | 8/2016 | Jung | H04W 36/0016 |

FOREIGN PATENT DOCUMENTS

| | | |
|---|---|---|
| EP | 1 727 383 A1 | 11/2006 |
| WO | 2007/003686 A1 | 1/2007 |
| WO | 2011/009496 A1 | 1/2011 |

OTHER PUBLICATIONS

The Office Action issued on Nov. 30, 2015 in the CN counterpart application (201210234916.4).
International Search Report and Written Opinion for PCT/CN2013/078906.

\* cited by examiner

UE CONFIGURATION METHOD, NETWORK SIDE DEVICE AND SYSTEM FOR PROXIMITY AWARENESS

This application is a U.S. National Stage of International Application No. PCT/CN2013/078906, filed on 5 Jul. 2013, designating the United States, and claiming priority to Chinese Patent Application No. 201210234916.4, filed with the Chinese Patent Office on Jul. 6, 2012 and entitled "a method of and network side device and system for configuring UE for proximity awareness", the content of which is hereby incorporated by reference in its entirety.

FIELD

The present invention relates to the field of communications and particularly to a method of and network side device and system for configuring a UE for proximity awareness.

BACKGROUND

As illustrated in FIG. 1, a cellular communication system generally includes a User Equipment (UE), a radio access network and a core network.

Particularly an Evolved Universal Terrestrial Radio Access Network (E-UTRAN) is a radio access network including (evolved) Node Bs (eNBs) connected with each other. An Evolved Packet Core (EPC) is a core network system including a Home Subscriber Server (HSS), a Mobility Management Entity (MME) and a Gateway (GW), where the HSS is configured to store subscription data of subscribers, the MME is configured to perform mobility management on a UE, and the gateway is configured to perform functions of storing, forwarding and routing user plane data of the UE.

In an existing cellular communication system, in a scenario where a user application accesses a user service network, the user application can only access an application service network (including an operator, services and the Internet) over a data transmission channel set up by a UE after the UE accesses the cellular network and a proxy function provided by a core network gateway.

In a scenario where UEs communicate with each other, the UEs have to communicate with each other through relay and proxy functions provided by an eNB and a gateway, and the existing cellular communication system doesn't support such a function that service information is obtained by the UEs for proximity awareness between them.

If the Device to Device (D2D) technology is introduced into the cellular network, then various service instances can be available so that one of the UEs can obtain service information directly from the other UE through D2D communication between the UEs, and this will impose a revolutionary influence upon the existing service model of the cellular communication system, that is, the introduction of the D2D technology will come with the possibility of various new service patterns.

However the integration of the D2D technology with application services has been just conceptually developed and there has been absent a solution to have them combined so far.

SUMMARY

Embodiments of the invention provide a method of, network side device and system for configuring a UE for proximity awareness so that service information can be obtained by UEs for proximity awareness between them in a cellular communication system.

Technical solutions according to the embodiments of the invention are as follows:

A method of configuring a transmitting User Equipment (UE) for proximity awareness includes:

receiving and storing, by a network side device, subscription information of the UE transmitted by a Home Subscriber Server (HSS), wherein the subscription information carries respective types of services to which the UE subscribes;

determining, by the network side device, a list of service identifiers of the respective types of services to which the UE subscribes according to a preset mapping relationship between the service identifiers and the types of services and allocating a temporary device identifier to the UE; and transmitting, by the network side device, the list and the temporary device identifier to a base station so that the base station configures the UE with the list and the temporary device identifier.

A method of configuring a receiving User Equipment (UE) for proximity awareness includes:

receiving and storing, by a network side device, subscription information of a UE transmitted by a Home Subscriber Server (HSS), wherein the subscription information carries respective types of services to which the UE subscribes;

determining, by the network side device, a filter template of service identifiers corresponding to the respective types of services to which the UE subscribes according to a preset mapping relationship between the service identifiers and the types of services, wherein the filter template of service identifiers is configured to filter respective service identifiers carried in a proximity awareness message received by the UE via an air interface, and the filter template of service identifiers includes at least a list of service identifiers; and transmitting, by the network side device, the filter template of service identifiers to a base station so that the base station configures the UE with the filter template of service identifiers.

A method of inquiring about service information by a receiving UE configured in the method above includes:

receiving, by a network side device, a first service information inquiry request, which carries a service identifier to be inquired about and a temporary device identifier of a transmitting UE, transmitted by the receiving UE;

determining, by the network side device, a permanent identifier corresponding to the temporary device identifier of the transmitting UE according to a mapping relationship between the temporary device identifier and the permanent identifier and transmitting a second service information inquiry request which carries the service identifier to be inquired about and the permanent identifier to a Home Subscriber Server (HSS); and receiving, by the network side device, service information returned by the HSS and transmitting the service information to the receiving UE.

A method of inquiring about service information by a receiving UE configured in the method above includes:

receiving, by a first network side device which serves the receiving UE, a first service information inquiry request, which carries a service identifier to be inquired about and a temporary device identifier of a transmitting UE, transmitted by the receiving UE;

determining, by the first network side device, a second network side device which serves the transmitting UE according to identifier information of a network side device included in the temporary device identifier of the transmitting UE and forwarding the first service information inquiry request to the second network side device; and determining, by the second network side device, a permanent identifier corresponding to the temporary device identifier of the transmitting UE according to a mapping relationship between the temporary device identifier and the permanent identifier, transmitting a second service information inquiry request which carries the service identifier to be inquired about and the permanent identifier to a Home Subscriber Server (HSS), and receiving the service information retrieved by the HSS in response to the second service information inquiry request and then transmitting the service information to the receiving UE through the first network side device.

A network side device includes:

a receiving unit configured to receive and store subscription information of a User Equipment (UE) transmitted by a Home Subscriber Server (HSS), wherein the subscription information carries respective types of services to which the UE subscribes;

a determining unit configured to determine a list of service identifiers of the respective types of services to which the UE subscribes according to a preset mapping relationship between the service identifiers and the types of services and to allocate a temporary device identifier to the UE; and a transmitting unit configured to transmit the list and the temporary device identifier to a base station so that the base station configures the UE with the list and the temporary device identifier.

A network side device includes:

a receiving unit configured to receive and store subscription information of a User Equipment (UE) transmitted by a Home Subscriber Server (HSS), wherein the subscription information carries respective types of services to which the UE subscribes;

a determining unit configured to determine a filter template of service identifiers corresponding to the respective types of services to which the UE subscribes according to a preset mapping relationship between the service identifiers and the types of services, wherein the filter template of service identifiers is configured to filter respective service identifiers carried in a proximity awareness message received by the UE via an air interface, and the filter template of service identifiers comprises at least a list of service identifiers; and a transmitting unit configured to transmit the filter template of service identifiers to a base station so that the base station configures the UE with the filter template of service identifiers.

A system for inquiring about service information includes:

a receiving User Equipment (UE) configured to transmit a first service information inquiry request, which carries a service identifier to be inquired about and a temporary device identifier of a transmitting UE, to a network side device;

the network side device configured to receive the first service information inquiry request, to determine a permanent identifier corresponding to the temporary device identifier of the transmitting UE according to a mapping relationship between the temporary device identifier and the permanent identifier, to transmit a second service information inquiry request which carries the service identifier to be inquired about and the permanent identifier to a Home Subscriber Server (HSS), and to receive service information returned by the HSS and transmit the service information to the receiving UE; and the HSS configured to receive the second service information inquiry request, to inquire a correspondence relationship between the permanent identifier and subscription data of the UE, to determine the subscription data corresponding to the permanent identifier carried in the second service information inquiry request, and to obtain the service information corresponding to the service identifier carried in the second service information inquiry request from the subscription data and return the service information to the network side device.

A system for inquiring about service information includes:

a receiving User Equipment (UE) configured to transmit a first service information inquiry request, which carries a service identifier to be inquired about and a temporary device identifier of a transmitting UE, to a first network side device which serves the receiving UE;

the first network side device, which serves the receiving UE, configured to receive the first service information inquiry request transmitted by the receiving UE, to determine a second network side device which serves the transmitting UE from identifier information of a network side device included in the temporary device identifier of the transmitting UE, to forward the first service information inquiry request to the second network side device, and to receive service information returned by the second network side device and transmit the service information to the receiving UE;

the second network side device, which serves the transmitting UE, configured to receive the first service information inquiry request transmitted by the first network side device, to determine a permanent identifier corresponding to the temporary device identifier of the transmitting UE according to a mapping relationship between the temporary device identifier and the permanent identifier, to transmit a second service information inquiry request which carries the service identifier to be inquired about and the permanent identifier to a Home Subscriber Server (HSS), to receive the service information obtained by the HSS in response to the second service information inquiry request, and to transmit the service information to the first network side device; and the HSS configured to determine subscription data of the transmitting UE according to the permanent identifier of the transmitting UE carried in the second service information inquiry request, to obtain the service information corresponding to the service identifier carried in the second service information inquiry request from the subscription data, and to return the service information to the second network side device.

With the technical solutions above, in the embodiments of the invention, a network side device determines a list of service identifiers of respective types of services to which a transmitting UE subscribes and a temporary device identifier of the transmitting UE and configures the UE as a transmitter for proximity awareness using the list of service identifiers and the temporary device identifier. In the meantime, the network side device determines a filter template of service identifiers corresponding to respective types of services to which a receiving UE subscribes and configures the UE as a receiver for proximity awareness using the filter template of service identifiers, and the receiver filters respective service identifiers carried in a proximity awareness message received via an air interface using the filter template of service identifiers, where the configured transmitting UE and receiving UE constitute a proximity awareness system between the UEs, so that service information can be obtained by the UEs for proximity awareness between them in a cellular communication system, thus offering a new service pattern, providing users with diversified services and enabling the cellular network to be developed towards being more intelligent.

DETAILED DESCRIPTION OF THE EMBODIMENTS

In order to enable such a function in a cellular communication system that service information is obtained by UEs for proximity awareness between them, embodiments of the invention provide a method of configuring a UE for proximity awareness.

Preferred embodiments of the invention will be described below in details with reference to the drawings.

The following embodiments will be described taking a Node B as an example although they can be applicable to an evolved Node B (eNB) in a practical application.

Figure 1:
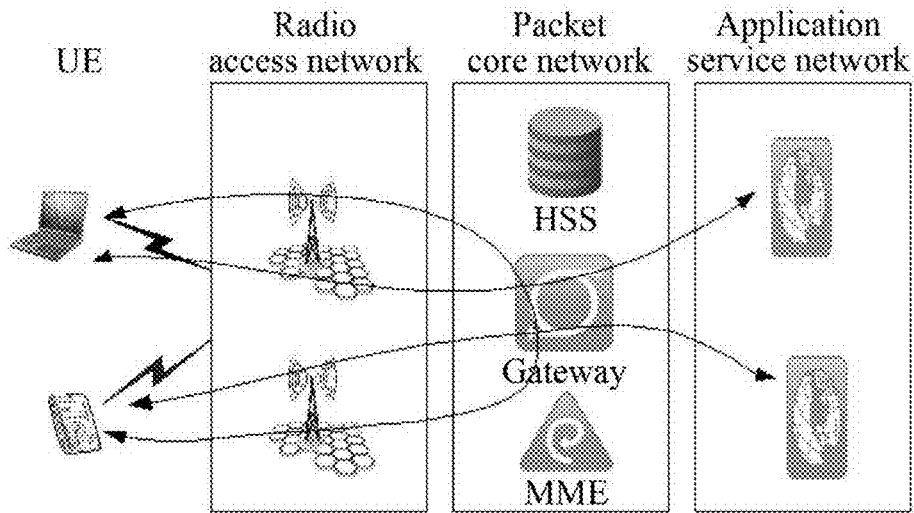
FIG. 1 is a schematic diagram of the architecture of the cellular communication system in the prior art.
Figure 2:
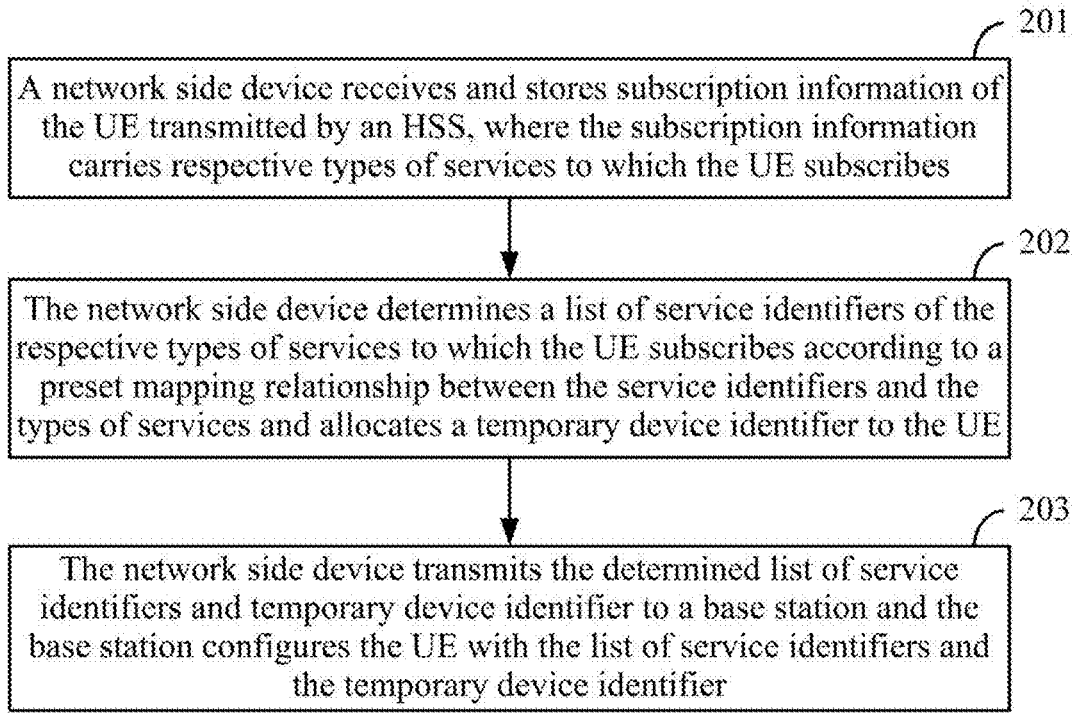
FIG. 2 is a flow chart of a method of configuring a transmitting UE for proximity awareness according to an embodiment of the invention.

As illustrated in FIG. 2, an embodiment of the invention provides a method of configuring a transmitting UE for proximity awareness, where the method generally includes the following operations:

Operation 201, a network side device receives and stores subscription information of the UE transmitted from an HSS, where the subscription information carries respective types of services to which the UE subscribes.

The UE and the HSS store the respective types of services, to be delivered, to which the UE subscribes, respectively in the form of subscription data, for example, the types of services can include types of advertisements or their subordinate types of advertisements including restaurant advertisements, clothing advertisements, performance ticket advertisements, home appliance advertisements, etc.

In the embodiment of the invention, the network side device refers to a core network node with a function of management on proximity awareness of the UE and can be embodied as an MME or can be embodied as another core network node.

If the network side device is other than an MME, then there is an interface between the network side device and the MME. The subscription information of the UE transmitted by the HSS can be received directly, or the subscription information of the UE transmitted by the HSS can be received through the MME.

Operation 202, the network side device determines a list of service identifiers of the respective types of services to which the UE subscribes according to a preset mapping relationship between the service identifiers and the types of services and allocates a temporary device identifier to the UE.

Preferably the temporary device identifier further includes identifier information of the network side device which allocates the temporary device identifier to the UE. Particularly the temporary device identifier includes the identifier information of the network side device which allocates the temporary device identifier to the UE and identifier information uniquely identifying the UE.

In a practical application, the mapping relationship between the service identifiers and the types of services locally stored in the network side device can be set by an operator and can be dynamically controlled. The temporary device identifier of the UE can be allocated by the network side device, and when the UE moves to a service area of a new network side device, the new network side device can reallocate a temporary device identifier to the UE. The reallocated temporary device identifier includes identifier information of the new network side device.

In a practical application, the network side device in combination with a local policy can further determine the list of service identifiers of the respective types of services to which the UE subscribes, the local policy generally used in the case that the subscribing UE roams, the network side device serving the current network judges from subscription data of the UE stored in a home network and a real condition of the local network whether to provide the UE with a proximity awareness service and provides the UE with the proximity awareness service according to types of services supported in the local network. For example, if types of services supported in the network where the UE roams include types of advertisement services and types of social services, and types of services to which the UE subscribes in the home network are types of drug services, so the types of drug services are not supported in the network where the UE roams, then the UE may not be provided with the proximity awareness service.

Operation 203, the network side device transmits the determined list of service identifiers and temporary device identifier to a base station and the base station configures the UE with the list of service identifiers and the temporary device identifier.

Particularly the base station configures with the determined list of service identifiers and temporary device identifier in Radio Resource Control (RRC) signaling.

If the network side device is other than an MME, then the network side device can transmit the determined list of service identifiers and temporary device identifier to the base station through the MME.

In this embodiment, the base station can further control UE to activate or deactivate a function of transmitting a proximity awareness message in RRC dedicated signaling.

Particularly after the UE activates the function of transmitting a proximity awareness message as instructed by the base station, the UE broadcasts a proximity awareness message carrying the list of service identifiers and the temporary device identifier via an air interface so that a receiving UE receives the proximity awareness message via an air interface.

Particularly the base station can both configure the UE with the determined list of service identifiers and temporary device identifier, and instruct the UE to activate the function of transmitting a proximity awareness message, in the same RRC dedicated signaling, or can configure the UE with the determined list of service identifiers and temporary device identifier, and instruct the UE to activate the function of transmitting a proximity awareness message, respectively in two pieces of separate RRC dedicated signaling.

Figure 3:
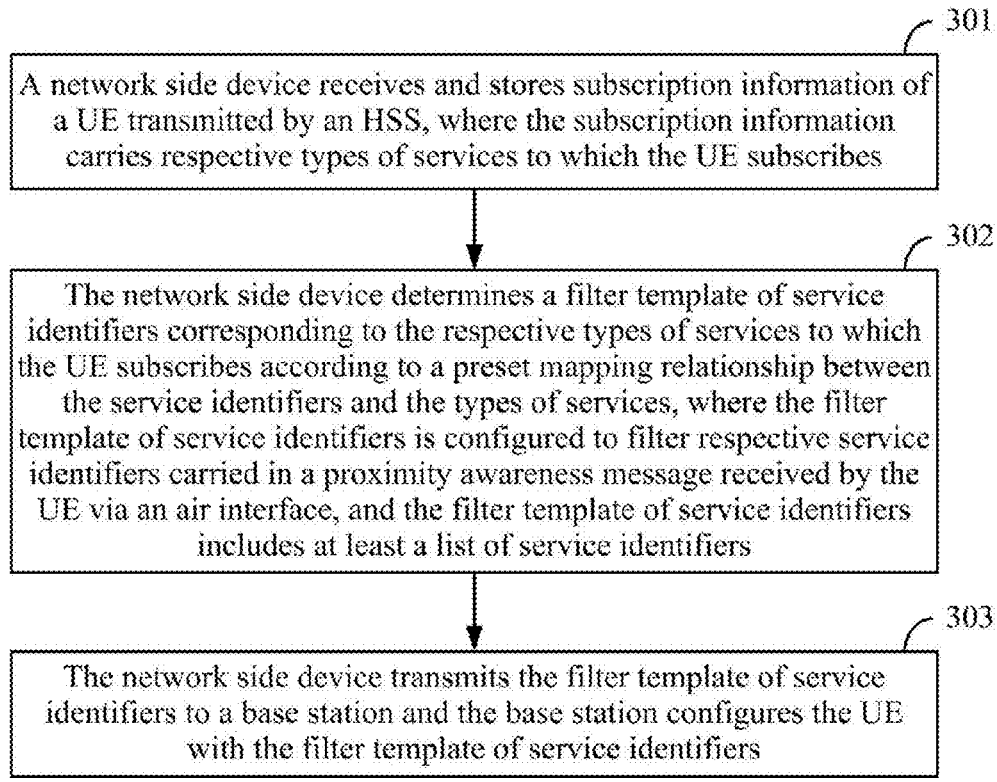
FIG. 3 is a flow chart of a method of configuring a receiving UE for proximity awareness according to an embodiment of the invention.

As illustrated in FIG. 3, an embodiment of the invention provides a method of configuring a receiving UE for proximity awareness, where the method generally includes the following operations:

Operation 301, a network side device receives and stores subscription information of a UE transmitted by an HSS, the subscription information carries respective types of services to which the UE subscribes.

The UE and the HSS store the respective types of services, to be received, to which the UE subscribes respectively in the form of subscription data, and the HSS further transmits the subscription information of the UE to the network side device serving the UE.

If the network side device is other than an MME, there is an interface between the network side device and the MME. The subscription information of the UE transmitted by the HSS can be received directly, or the subscription information of the UE transmitted by the HSS can be received through the MME.

Operation 302, the network side device determines a filter template of service identifiers corresponding to the respective types of services to which the UE subscribes according to a preset mapping relationship between the service identifiers and the types of services, where the filter template of service identifiers is configured to filter respective service identifiers carried in a proximity awareness message received by the UE via an air interface, and the filter template of service identifiers includes at least a list of service identifiers.

Particularly the filter template of service identifiers can further include service information corresponding to the service identifiers so that the proximity awareness message received via the air interface can be filtered by matching the service information.

In a practical application, the network side device in combination with a local policy can further determine the filter template of service identifiers, the local policy is used generally in the case that the subscribing UE roams, the network side device serving the current network judges from subscription data of the UE stored in a home network and a real condition of the local network whether to provide the UE with a proximity awareness service and provides the UE with the proximity awareness service according to types of services supported in the local network.

Operation 303, the network side device transmits the filter template of service identifiers to a base station and the base station configures the UE with the filter template of service identifiers.

Particularly the network side device can transmit the generated filter template of service identifiers to the base station as a part of a context of the UE and the base station locally stores the context of the UE.

Particularly the base station configures the UE with the filter template of service identifiers in RRC dedicated signaling.

If the network side device is other than an MME, then the network side device can transmit the filter template of service identifiers to the UE through the MME.

In this embodiment, the base station can further control the UE to activate or deactivate a function of receiving a proximity awareness message in RRC dedicated signaling.

Particularly after the UE activates the function of receiving a proximity awareness message as instructed by the base station, the UE receives via an air interface a proximity awareness message, carrying a list of service identifiers and a temporary device identifier, broadcast by a transmitting UE via an air interface.

Particularly upon reception of a configuration instruction message, carrying the filter template of service identifiers, transmitted by the base station, the UE sets the filter template of service identifiers at the access layer, and after the UE receives the proximity awareness message via the air interface, the access layer of the UE filters the respective service identifiers carried in the received proximity awareness message according to the configured filter template of service identifiers and then notifies the application layer of the UE.

In a practical application, the base station can configure the UE with the determined list of service identifiers and temporary device identifier, and instruct the UE to activate the function of receiving a proximity awareness message, in the same RRC dedicated signaling, or can configure the UE with the determined list of service identifiers and temporary device identifier, and instruct the UE to activate the function of receiving a proximity awareness message, respectively in two pieces of separate RRC dedicated signaling.

Figure 4:
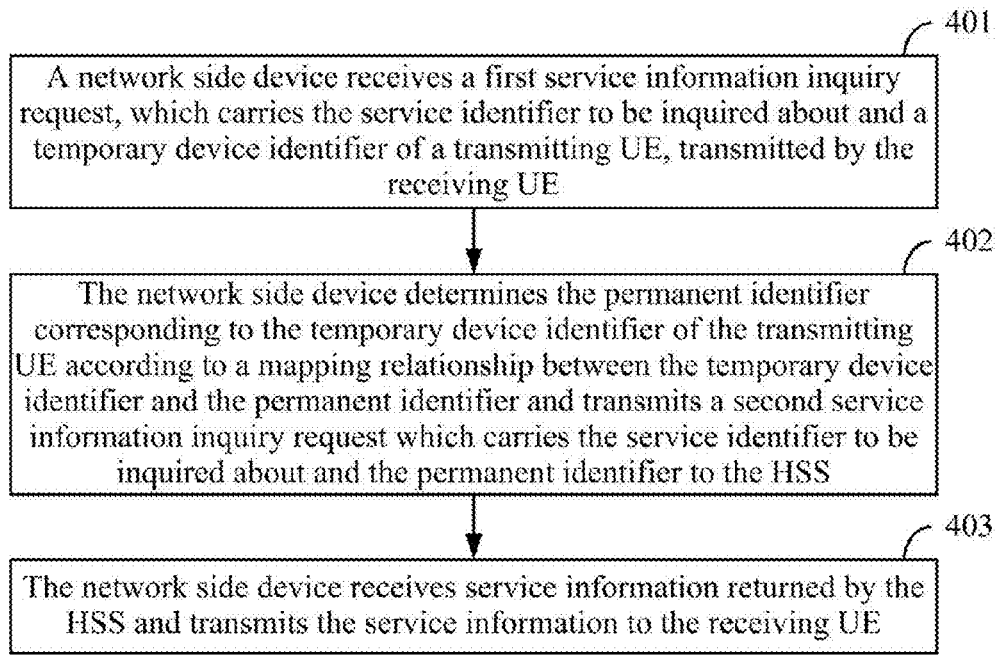
FIG. 4 is a flow chart of a method of inquiring about service information by a receiving UE according to an embodiment of the invention.

In the case that a receiving UE and a transmitting UE are served by the same network side device, as illustrated in FIG. 4, an embodiment of the invention further provides a method of inquiring about service information by a receiving UE configured in the method above, the method generally includes the following operations:

Operation 401, a network side device receives a first service information inquiry request, carrying the service identifier to be inquired about and a temporary device identifier of a transmitting UE, transmitted by the receiving UE.

In this embodiment, an HSS and the UE store detailed service information of the UE in the form of subscription data and store the subscription data of the UE using a permanent identifier of the UE as an index.

Preferably the permanent identifier of the UE is an International Mobile Subscriber Identifier (IMSI).

For example, the HSS uses the IMSI of the UE as an index of detailed service information about a service to which the UE subscribes, the detailed service information can be "XXX offers various toasted ducks at Wu Dao Kou and is contacted at Tele. XXXXXX . . . ."

After the transmitting UE obtains the service identifier and the temporary device identifier from the network side and activates a function of transmitting a proximity awareness message, the transmitting UE broadcasts a proximity awareness message via an air interface.

Upon reception of the proximity awareness message via an air interface, the receiving UE obtains the service identifier, and the temporary device identifier of the transmitting UE, from the proximity awareness message, and when the receiving UE needs to obtain more detailed service information, the receiving UE initiates the first service information inquiry request to the network side device.

Preferably upon reception of the first service information inquiry request, the network side device determines from the subscription information of the receiving UE whether the receiving UE subscribes to a function of inquiring about service information and further requests the HSS for an inquiry about the service information upon determining that the receiving UE subscribes to the function of inquiring about service information.

If the network side device is other than an MME, then the network side device can request directly the HSS for an inquiry about the service information or can request the HSS for an inquiry about the service information through the MME.

Operation 402, the network side device determines the permanent identifier corresponding to the temporary device identifier of the transmitting UE according to a mapping relationship between the temporary device identifier and the permanent identifier and transmits a second service information inquiry request carrying the service identifier to be inquired about and the permanent identifier to the HSS.

If the network side device is other than an MME, then the network side device can transmit the second service information inquiry request carrying the service identifier to be inquired about and the permanent identifier directly to the HSS or can transmit the second service information inquiry request carrying the service identifier to be inquired about and the permanent identifier to the HSS through the MME.

The network side device determines from the identifier information of the network side device of the transmitting UE in the temporary device identifier that the network side device serving the transmitting UE is the same as the network side device serving the receiving UE.

Operation 403, the network side device receives service information returned by the HSS and transmits the service information to the receiving UE.

If the network side device is other than an MME, then the network side device can receive the service information directly from the HSS or can receive the service information from the HSS through the MME.

After the network side device transmits the second service information inquiry request carrying the service identifier to be inquired about and the permanent identifier to the HSS, the HSS inquires a correspondence relationship between the permanent identifier and the subscription data of the UE, determines the subscription data corresponding to the permanent identifier carried in the second service information inquiry request, obtains the service information corresponding to the service identifier carried in the second service information inquiry request from the subscription data and returns the service information to the network side device by carrying it in a service information indication message, the service indication message further carries the permanent identifier and the service identifier.

Particularly the network side device replaces the permanent identifier carried in the service information indication message returned by the HSS with the temporary device identifier of the transmitting UE and transmits the updated service information indication message to the receiving UE.

Preferably the HSS transmits the service information as a result of the inquiry to the network side device by carrying it in a service information container in the service information indication message, and the network side device will not parse the service information container but can transmit the service information indication message including the service information container, the service identifier and the temporary device identifier directly to the UE.

In another implementation, the network side device can transmit the service information returned by the HSS to the UE in the form of a short message, etc., after obtaining the service information.

Figure 5:
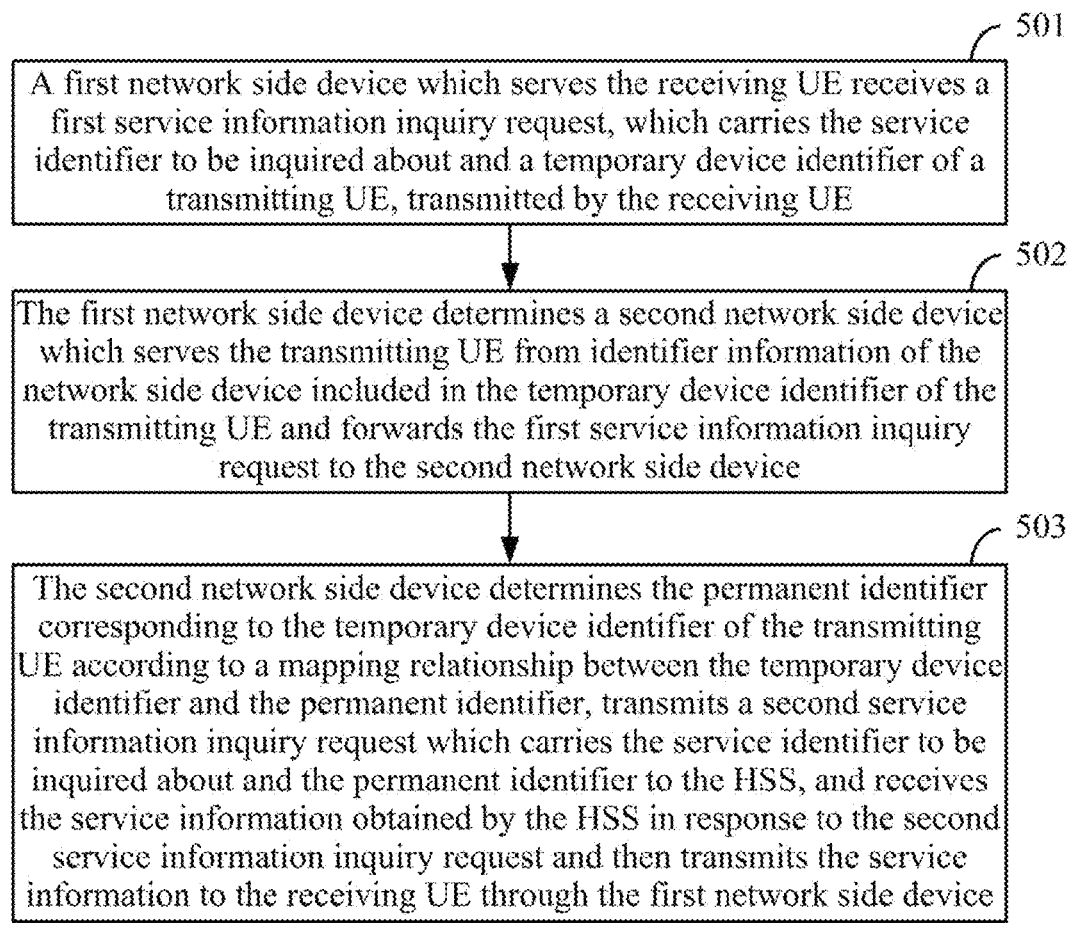
FIG. 5 is a flow chart of another method of inquiring about service information by a receiving UE according to an embodiment of the invention.

In the case that a receiving UE and a transmitting UE aren't served by the same network side device, as illustrated in FIG. 5, an embodiment of the invention further provides a method of inquiring about service information by a receiving UE configured in the method above, the method generally includes the following operations:

Operation 501, a first network side device serving the receiving UE receives a first service information inquiry request, which carries the service identifier to be inquired about and a temporary device identifier of a transmitting UE, transmitted by the receiving UE.

In this embodiment, an HSS and the transmitting UE store detailed service information of the UE in the form of subscription data and store the subscription data of the UE using a permanent identifier of the transmitting UE as an index. Preferably the permanent identifier of the transmitting UE is an International Mobile Subscriber Identity (IMSI).

After the transmitting UE obtains the service identifier and the temporary device identifier from the network side and activates a function of transmitting a proximity awareness message, the transmitting UE broadcasts a proximity awareness message via an air interface.

Upon reception of the proximity awareness message via an air interface, the receiving UE obtains the service identifier, and the temporary device identifier of the transmitting UE, from the proximity awareness message, and when the receiving UE needs to obtain more detailed service information, the receiving UE initiates the first service information inquiry request to the first network side device.

Preferably upon reception of the first service information inquiry request, the first network side device determines from the subscription information of the receiving UE whether the receiving UE subscribes to a function of inquiring about service information and further performs a subsequent process upon determining that the receiving UE subscribes to the function of inquiring about service information.

Operation 502, the first network side device determines a second network side device serving the transmitting UE from identifier information of the network side device included in the temporary device identifier of the transmitting UE and forwards the first service information inquiry request to the second network side device.

Operation 503, the second network side device determines the permanent identifier corresponding to the temporary device identifier of the transmitting UE according to a mapping relationship between the temporary device identifier and the permanent identifier, transmits a second service information inquiry request carrying the service identifier to be inquired about and the permanent identifier to the HSS, and receives the service information obtained by the HSS in response to the second service information inquiry request and then transmits the service information to the receiving UE through the first network side device.

After the second network side device transmits the second service information inquiry request carrying the service identifier to be inquired about and the permanent identifier to the HSS, the HSS determines the subscription data of the transmitting UE according to the permanent identifier of the transmitting UE carried in the second service information inquiry request, obtains the service information corresponding to the service identifier carried in the second service information inquiry request from the subscription data and returns the service information to the second network side device by carrying it in a service information indication message, the service information indication message further carries the permanent identifier and the service identifier.

Particularly upon reception of the service information indication message returned by the HSS, the second network side device replaces the permanent identifier carried in the service information indication message with the temporary device identifier of the transmitting UE and then transmits the updated service information indication message to the first network side device.

Preferably the HSS transmits the service information as a result of the inquiry to the second network side device by carrying it in a service information container in the service information indication message, and the second network side device will not parse but forward the service information indication message to the first network side device, and the first network side device simply transmits the service information indication message including the service information container, the service identifier and the temporary device identifier to the UE.

In another implementation, the network side device can transmit the service information returned by the HSS to the UE in the form of a short message, etc., after obtaining the service information.

A particular process according to the embodiment of the invention in which service information is obtained by UEs for proximity awareness between them will be described below in four particular embodiments.

Figure 6:
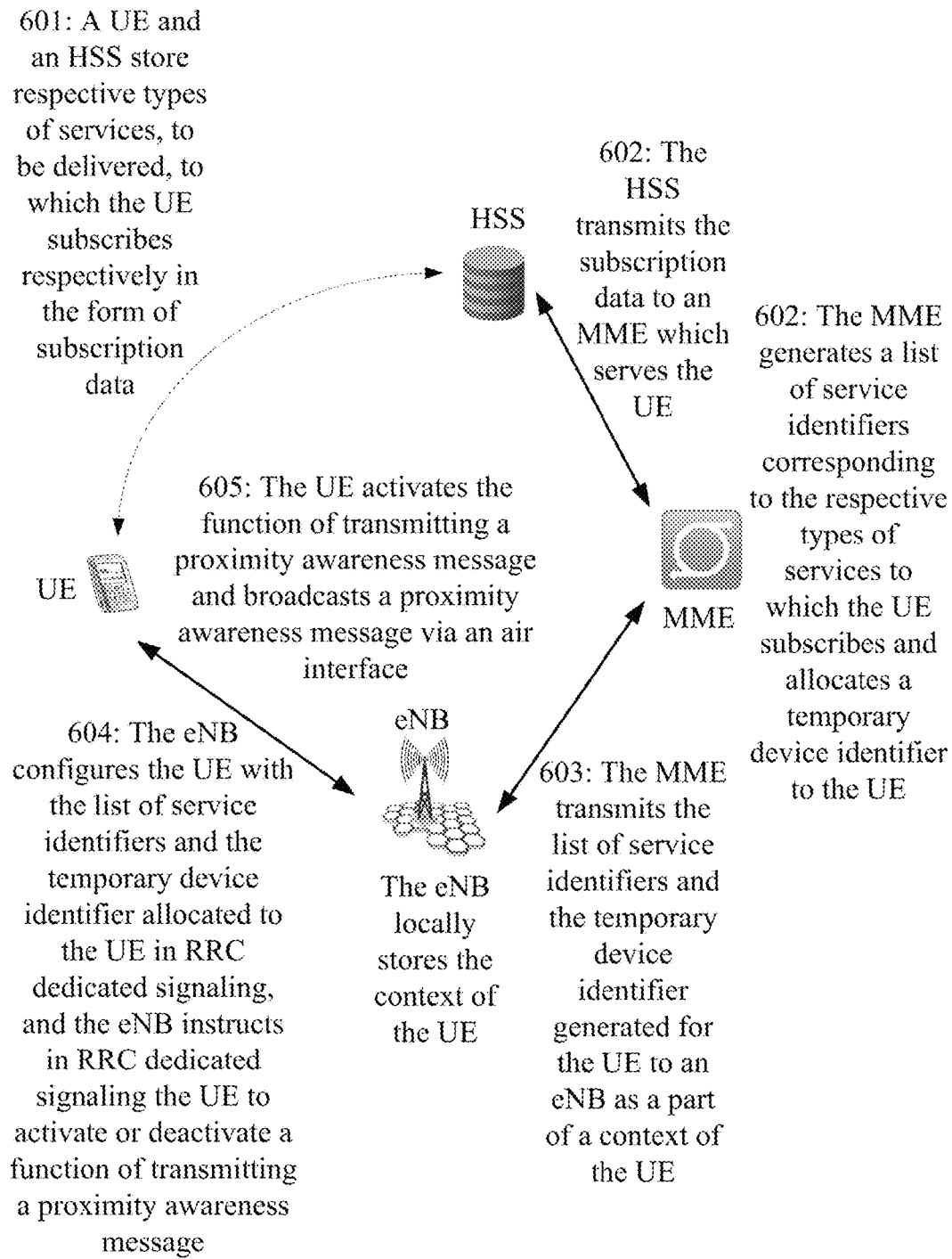
FIG. 6 is a particular flow chart of configuring a transmitting UE according to an embodiment of the invention.

In a first particular embodiment, as illustrated in FIG. 6, a process is as follows in which a transmitting UE is configured with service identifiers corresponding to respective types of services and a temporary device identifier:

Operation 601, a UE and an HSS store respective types of services, to be delivered, to which the UE subscribes respectively in the form of subscription data;

Operation 602, the HSS transmits the subscription data to an MME serving the UE, where the subscription data including the respective types of services, to be delivered, to which the UE subscribes; and the MME stores locally the subscription data of the UE, generates a list of service identifiers corresponding to the respective types of services to which the UE subscribes according to a preset mapping relationship between the types of services and the service identifiers and allocates a temporary device identifier to the UE to be carried in a proximity awareness message transmitted via an air interface, where the temporary device identifier further includes identifier information of the MME;

Operation 603, the MME transmits the list of service identifiers and the temporary device identifier, generated for the UE as a part of a context of the UE, to an eNB and the eNB locally stores the context of the UE.

Operation 604, the eNB configures the UE with the list of service identifiers and the temporary device identifier allocated to the UE in RRC dedicated signaling, and the eNB instructs in RRC dedicated signaling the UE to activate or deactivate a function of transmitting a proximity awareness message; or Operation 605, if the UE activates the function of transmitting a proximity awareness message in response to the activation instruction transmitted by the eNB, then the UE broadcasts the list of service identifiers and the temporary device identifier obtained from the network via an air interface by carrying them in a proximity awareness message.

Figure 7:
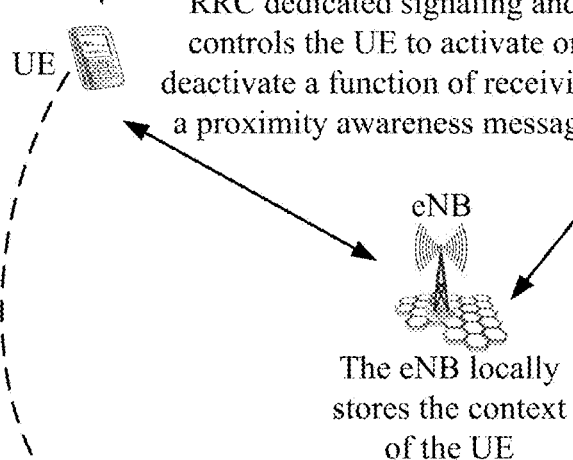
FIG. 7 is a particular flow chart of configuring a transmitting UE according to an embodiment of the invention.

In a second particular embodiment, as illustrated in FIG. 7, a process is as follows in which a transmitting UE is configured with a filter template of service identifiers:

Operation 701, a UE and an HSS store respective types of services, to be received, to which the UE subscribes respectively in the form of subscription data;

Operation 702, the HSS transmits the subscription data of the UE to an MME serving the UE, where the subscription data including the respective types of services, to be received, to which the UE subscribes; and the MME stores locally the subscription data of the UE, generates a filter template of service identifiers for the UE according to a preset mapping relationship between the types of services and service identifiers, the filter template of service identifiers includes service information corresponding to the respective service identifiers in addition to a list of service identifiers;

Operation 703, the MME transmits the filter template of service identifiers generated for the UE to an eNB as a part of a context of the UE and the eNB locally stores the context of the UE.

Operation 704, the eNB configures the UE with the filter template of service identifiers allocated to the UE in RRC dedicated signaling, and the eNB controls in RRC dedicated signaling the UE to activate or deactivate a function of receiving a proximity awareness message; or Operation 705, after the UE activates the function of receiving a proximity awareness message in response to the activation instruction of the eNB, the access layer of the UE enables the function of receiving a proximity awareness message transmitted via an air interface and filters a received proximity awareness message according to the filter template of service identifiers obtained from the network side and then notifies the application layer of the UE of the filtered proximity awareness message.

Figure 8:
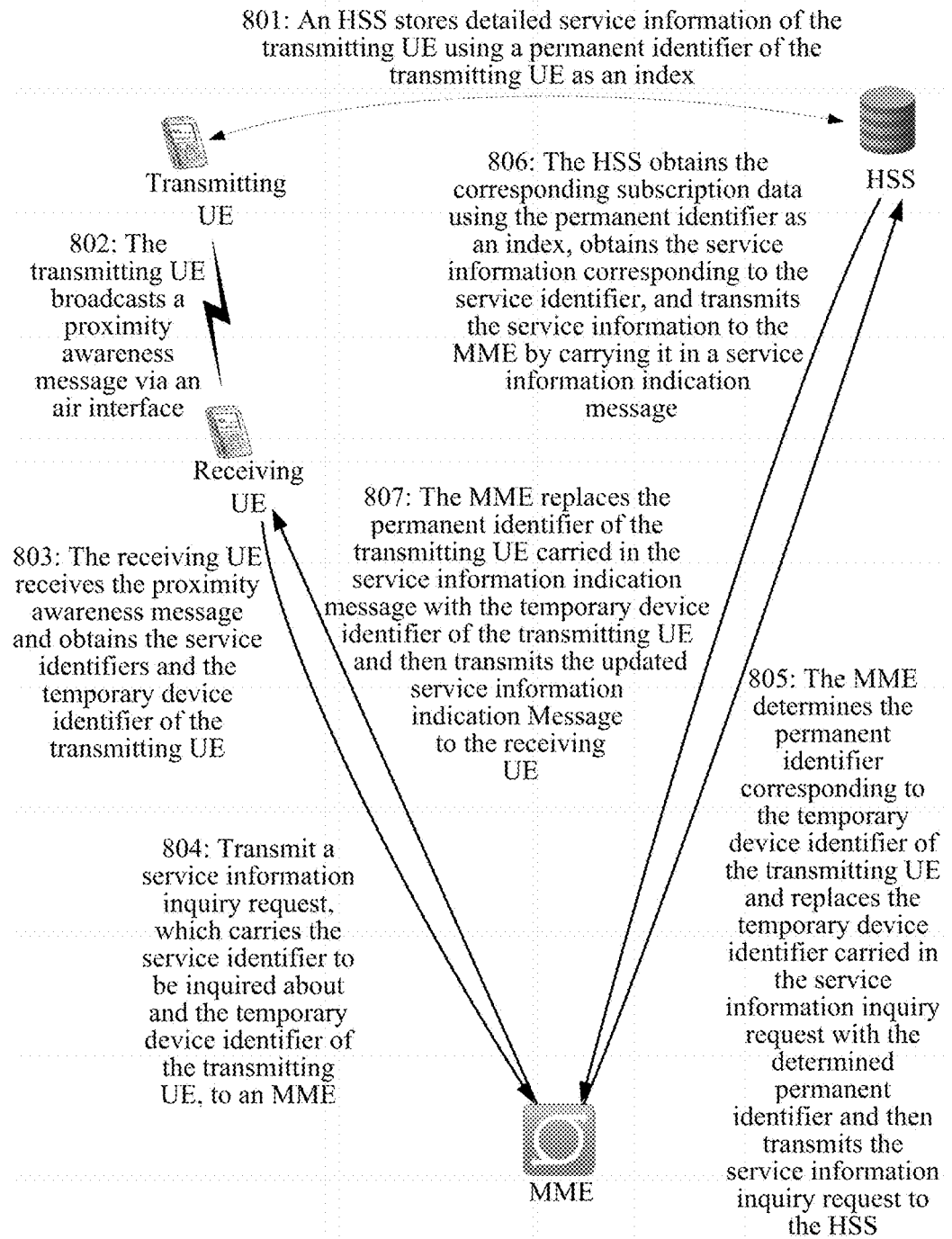
FIG. 8 is a particular flow chart of inquiring about detailed service information according to an embodiment of the invention.

In a third particular embodiment, as illustrated in FIG. 8, a process is as follows in which a receiving UE and a transmitting UE are served by the same MME, and the receiving UE inquires about detailed service information corresponding to a received service identifier:

Operation 801, an HSS stores detailed service information of the transmitting UE in the form of subscription data using a permanent identifier of the transmitting UE as an index.

Operation 802, the transmitting UE broadcasts a proximity awareness message via an air interface after obtaining a list of service identifiers and a temporary device identifier allocated thereto from the network side;

Operation 803, the receiving UE receives the proximity awareness message of the transmitting UE via an air interface and obtains the service identifiers and the temporary device identifier of the transmitting UE;

Operation 804, when the receiving UE needs to obtain the detailed service information, the receiving UE transmits a service information inquiry request, which carries the service identifier to be inquired about and the temporary device identifier of the transmitting UE, to an MME;

Operation 805, the MME firstly judges from subscription information of the receiving UE whether the receiving UE subscribes to a function of inquiring about service information upon reception of the service information inquiry request, and if so, then the MME determines the permanent identifier corresponding to the temporary device identifier of the transmitting UE according to a mapping relationship between the temporary device identifier and the permanent identifier and replaces the temporary device identifier carried in the service information inquiry request with the determined permanent identifier and then transmits the service information inquiry request to the HSS;

Operation 806, the HSS retrieves the corresponding subscription data using the permanent identifier carried in the service information inquiry request as an index and further obtains the detailed service information, in the subscription data, corresponding to the service identifier carried in the service information inquiry request, and transmits the service information to the MME by carrying it in a service information indication message together with the corresponding service identifier and the permanent identifier of the transmitting UE; and Operation 807, the MME replaces the permanent identifier of the transmitting UE carried in the service information indication message with the temporary device identifier of the transmitting UE and then transmits the updated service information indication message to the receiving UE; or the MME obtains the service information in the service information indication message and transmits the service information to the receiving UE in the form of a short message.

Figure 9:
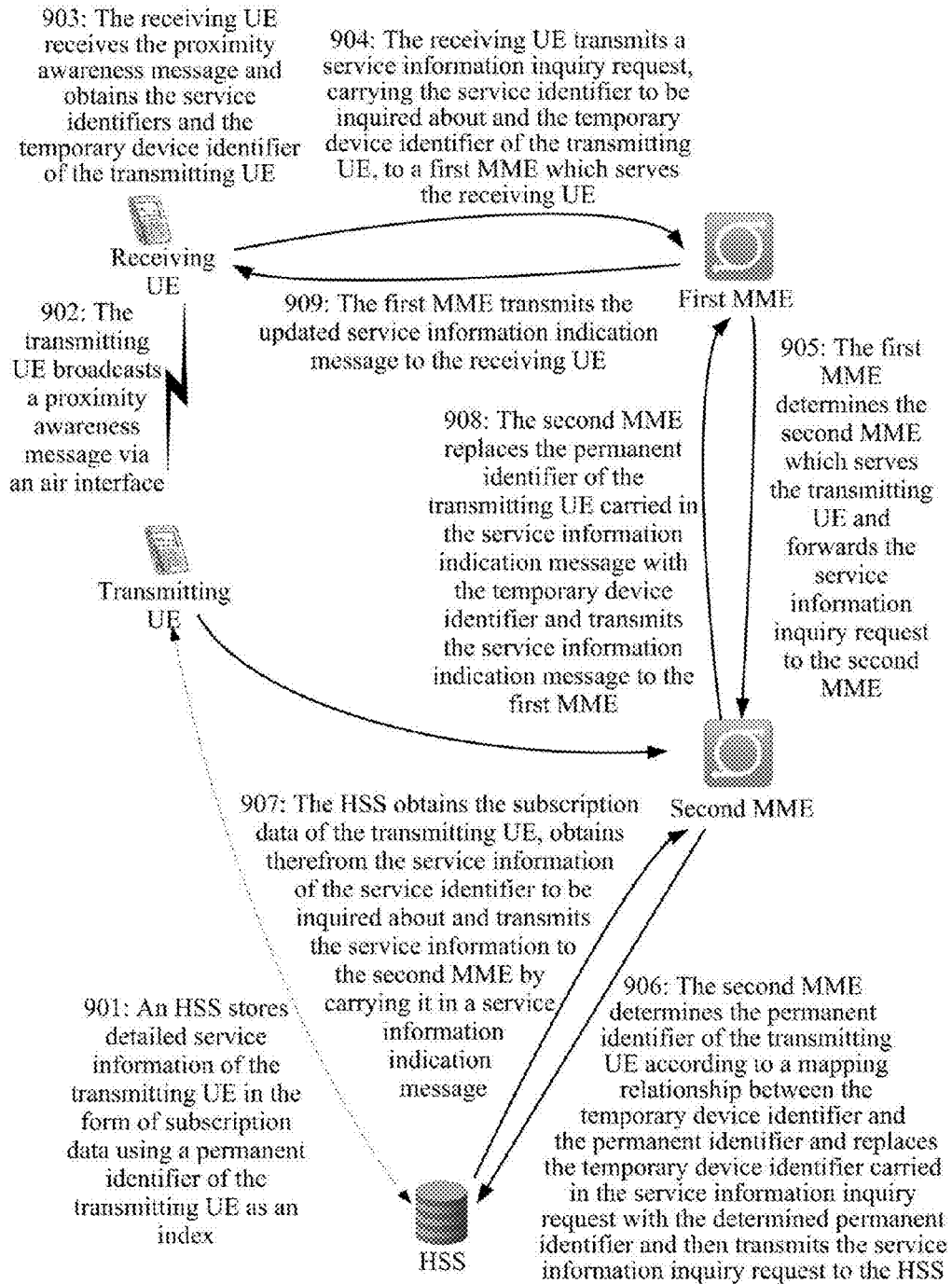
FIG. 9 is another particular flow chart of inquiring about detailed service information according to an embodiment of the invention.

In a fourth particular embodiment, as illustrated in FIG. 9, a process is as follows in which in the case that a receiving UE and a transmitting UE are served respectively by different MMEs, the receiving UE inquires about detailed service information of a received service identifier:

Operation 901, an HSS stores detailed service information of the transmitting UE in the form of subscription data using a permanent identifier of the transmitting UE as an index.

Operation 902, the transmitting UE broadcasts a proximity awareness message via an air interface after obtaining a list of service identifiers and a temporary device identifier allocated thereto from the network side;

Operation 903, the receiving UE receives the proximity awareness message of the transmitting UE via an air interface and obtains the service identifiers and the temporary device identifier of the transmitting UE;

Operation 904, when the receiving UE needs to obtain the detailed service information, the receiving UE transmits a service information inquiry request, which carries the service identifier to be inquired about and the temporary device identifier of the transmitting UE, to a first MME which serves the receiving UE;

Operation 905, the first MME firstly judges from subscription information of the receiving UE whether the receiving UE subscribes to a function of inquiring about service information upon reception of the service information inquiry request, and if so, then the first MME obtains identifier information of an MME included in the temporary device identifier carried in the service information inquiry request, determines the second MME which serves the transmitting UE and forwards the service information inquiry request to the second MME;

Operation 906, the second MME determines the permanent identifier corresponding to the temporary device identifier of the transmitting UE carried in the service information inquiry request according to a mapping relationship between the temporary device identifier and the permanent identifier and replaces the temporary device identifier carried in the service information inquiry request with the determined permanent identifier and then transmits the updated service information inquiry request to the HSS;

Operation 907, the HSS obtains the subscription data of the transmitting UE using the permanent identifier carried in the service information inquiry request as an index and further obtains the detailed service information corresponding to the service identifier, to be inquired about, carried in the service information inquiry request from the subscription data, and transmits the service information to the second MME by carrying it in a service information indication message together with the corresponding service identifier and the permanent identifier of the transmitting UE; and Operation 908, the second MME replaces the permanent identifier of the transmitting UE carried in the service information indication message with the temporary device identifier of the transmitting UE and transmits the updated service information indication message to the first MME; and Operation 909, the first MME transmits the updated service information indication message to the receiving UE; or the first MME transmits the service information in the service information indication message to the receiving UE in the form of a short message.

Figure 10:
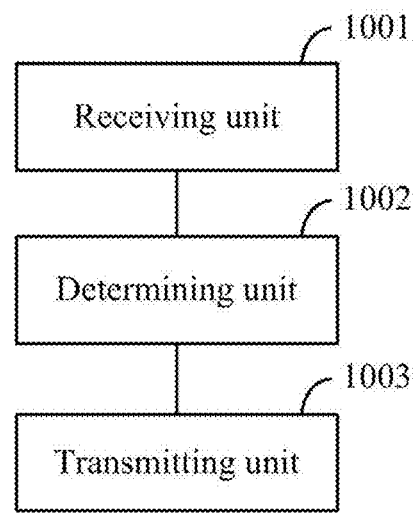
FIG. 10 is a schematic structural diagram of a network side device according to an embodiment of the invention.

Based upon the same inventive idea, as illustrated in FIG. 10, an embodiment of the invention further provides a network side device, and in this embodiment, the network side device is an MME by way of an example, and reference can be made to the implementation of the method above for a implementation of the network side device, so a repeated description thereof will be omitted here, where the network side device generally includes the following units:

A receiving unit 1001 is configured to receive and store subscription information of a UE transmitted by an HSS, where the subscription information carries respective types of services to which the UE subscribes;

A determining unit 1002 is configured to determine a list of service identifiers of the respective types of services to which the UE subscribes according to a preset mapping relationship between the service identifiers and the types of services and to allocate a temporary device identifier to the UE; and A transmitting unit 1003 is configured to transmit the determined list and temporary device identifier to a base station, which configures the UE with the list and the temporary device identifier.

Figure 11:
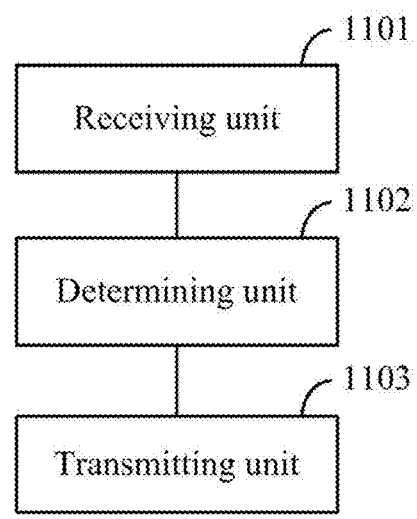
FIG. 11 is a schematic structural diagram of another network side device according to an embodiment of the invention.

Based upon the same inventive idea, as illustrated in FIG. 11, an embodiment of the invention further provides another network side device, and in this embodiment, the network side device is an MME by way of an example, and reference can be made to the implementation of the method above for a implementation of the network side device, so a repeated description thereof will be omitted here, where the network side device generally includes the following units:

A receiving unit 1101 is configured to receive and store subscription information of a UE transmitted by an HSS, where the subscription information carries respective types of services to which the UE subscribes;

A determining unit 1102 is configured to determine a filter template of service identifiers corresponding to the respective types of services to which the UE subscribes according to a preset mapping relationship between the service identifiers and the types of services, where the filter template of service identifiers is configured to filter respective service identifiers carried in a proximity awareness message received by the UE via an air interface, and the filter template of service identifiers includes at least a list of service identifiers; and A transmitting unit 1103 is configured to transmit the filter template of service identifiers to a base station, which configures the UE with the filter template of service identifiers.

Figure 12:
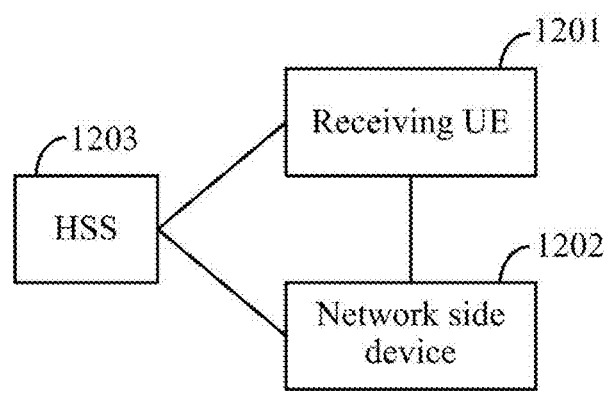
FIG. 12 is a schematic architectural diagram of a first system for inquiring about service information according to an embodiment of the invention.

Based upon the same inventive idea, as illustrated in FIG. 12, an embodiment of the invention further provides a system for inquiring about service information, and reference can be made to the implementation of the method above for a implementation of the system, so a repeated description thereof will be omitted here, where the system generally includes:

A receiving UE 1201 is configured to transmit a first service information inquiry request, carrying the service identifier to be inquired about and a temporary device identifier of a transmitting UE, to a network side device;

The network side device 1202 is configured to receive the first service information inquiry request, to determine a permanent identifier corresponding to the temporary device identifier of the transmitting UE according to a mapping relationship between the temporary device identifier and the permanent identifier, to transmit a second service information inquiry request carrying the service identifier to be inquired about and the permanent identifier to an HSS, and to receive service information returned by the HSS and transmit the service information to the receiving UE; and The HSS 1203 is configured to receive the second service information inquiry request, to inquire a correspondence relationship between the permanent identifier and subscription data of the UE, to determine the subscription data corresponding to the permanent identifier carried in the second service information inquiry request, and to obtain the service information corresponding to the service identifier carried in the second service information inquiry request from the subscription data and return the service information to the network side device.

Figure 14:
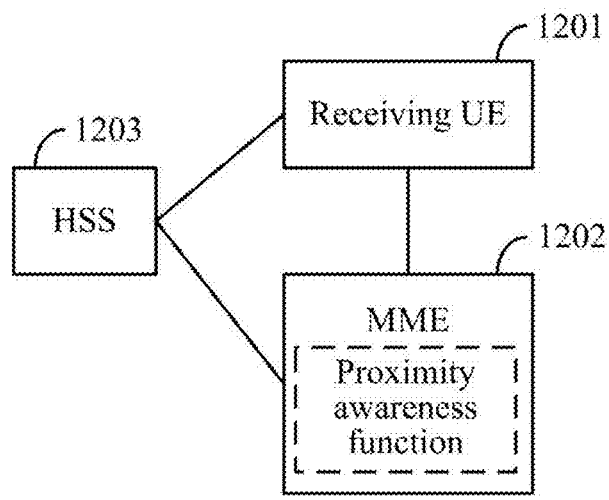
FIG. 14 is a schematic architectural diagram of a second system for inquiring about service information according to an embodiment of the invention.
Figure 15:
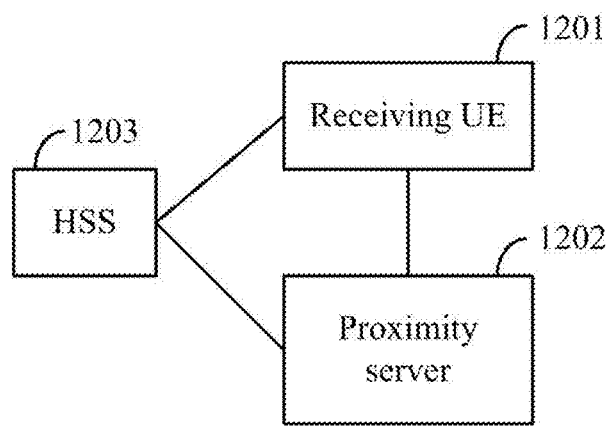
FIG. 15 is a schematic architectural diagram of a third system for inquiring about service information according to an embodiment of the invention.

If the network side device 1202 is an MME, then the corresponding system is as illustrated in FIG. 14. If the network side device 1202 is another core network node (which can be referred to as a Proximity Server (ProSe) for example), then the corresponding system is as illustrated in FIG. 15.

The HSS is further configured to return the service information to the network side device by carrying it in a service information indication message, the service information indication message further carries the permanent identifier and the service identifier.

The network side device is further configured to replace the permanent identifier carried in the service information indication message with the temporary device identifier of the transmitting UE upon reception of the service information indication message returned by the HSS and to transmit the updated service information indication message to the receiving UE.

The network side device is further configured to determine from subscription information of the receiving UE that the receiving UE subscribes to a function of inquiring about service information after receiving the first service information inquiry request and before transmitting the second service information inquiry request to the HSS.

Figure 13:
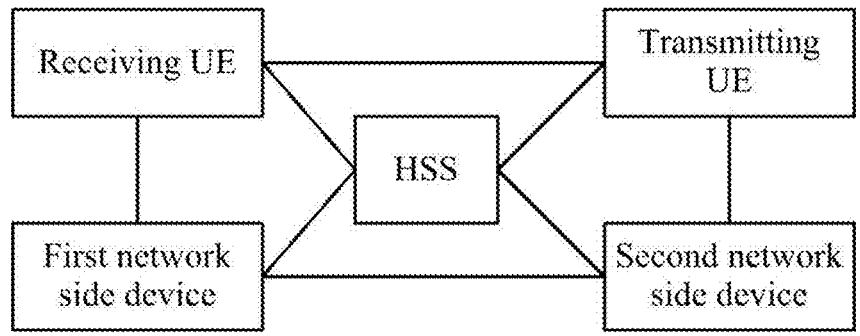
FIG. 13 is a schematic architectural diagram of another system for inquiring about service information according to an embodiment of the invention.

Based upon the same inventive idea, as illustrated in FIG. 13, an embodiment of the invention further provides another system for inquiring about service information, and reference can be made to the implementation of the method above for an implementation of the system, so a repeated description thereof will be omitted here, where the system generally includes:

A receiving UE is configured to transmit a first service information inquiry request, which carries the service identifier to be inquired about and a temporary device identifier of a transmitting UE, to a first network side device which serves the receiving UE;

The first network side device which serves the receiving UE is configured to receive the first service information inquiry request transmitted by the receiving UE, to determine a second network side device, which serves the transmitting UE, from identifier information of the network side device included in the temporary device identifier of the transmitting UE, to forward the first service information inquiry request to the second network side device, and to receive service information returned by the second network side device and transmit the service information to the receiving UE;

The second network side device which serves the transmitting UE is configured to receive the first service information inquiry request transmitted by the first network side device, to determine a permanent identifier corresponding to the temporary device identifier of the transmitting UE according to a mapping relationship between the temporary device identifier and the permanent identifier, to transmit a second service information inquiry request carrying the service identifier to be inquired about and the permanent identifier to an HSS, to receive the service information obtained by the HSS in response to the second service information inquiry request, and to transmit the service information to the first network side device; and The HSS is configured to determine subscription data of the transmitting UE according to the permanent identifier of the transmitting UE carried in the second service information inquiry request, to obtain the service information corresponding to the service identifier carried in the second service information inquiry request from the subscription data, and to return the service information to the second network side device.

The HSS is further configured to return the service information to the second network side device by carrying it in a service information indication message, the service information indication message further carries the permanent identifier and the service identifier.

The second network side device is further configured to replace the permanent identifier carried in the service information indication message with the temporary device identifier of the transmitting UE upon reception of the service information indication message returned by the HSS and then transmit the updated service information indication message to the first network side device.

The first network side device is further configured to determine from subscription information of the receiving UE that the receiving UE subscribes to a function of inquiring about service information after receiving the first service information inquiry request and before forwarding the first service information inquiry request to the second network side device.

With the technical solutions above, in the embodiments of the invention, a network side device determines a list of service identifiers of respective types of services to which a transmitting UE subscribes and a temporary device identifier of the transmitting UE and configures the UE as a transmitter for proximity awareness using the list of service identifiers and the temporary device identifier. In the meantime, the network side device determines a filter template of service identifiers corresponding to respective types of services to which a receiving UE subscribes and configures the UE as a receiver for proximity awareness using the filter template of service identifiers, and the receiver filters respective service identifiers carried in a proximity awareness message received via an air interface using the filter template of service identifiers, the configured transmitting UE and receiving UE constitute a proximity awareness system between the UEs, so that service information can be obtained by the UEs for proximity awareness between them in a cellular communication system, thus offering a new service pattern, providing users with diversified services and enabling the cellular network to be developed towards being more intelligent.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of configuring a transmitting User Equipment (UE) for proximity awareness, the method comprising:
receiving and storing, by a network side device, subscription information of the UE transmitted by a Home Subscriber Server (HSS), wherein the subscription information carries respective types of services to which the UE subscribes;
determining, by the network side device, a list of service identifiers of the respective types of services to which the UE subscribes according to a preset mapping relationship between the service identifiers and the types of services and allocating a temporary device identifier to the UE; and
transmitting, by the network side device, the list and the temporary device identifier to a base station so that the base station configures the UE with the list and the temporary device identifier.

2. The method according to claim 1, wherein the temporary device identifier further comprises identifier information of the network side device which allocates the temporary device identifier to the UE.

3. The method according to claim 1, wherein after the network side device transmits the list and the temporary device identifier to the base station, the method further comprises:
configuring, by the base station, the UE with the list and the temporary device identifier in Radio Resource Control (RRC) dedicated signaling.

4. The method according to claim 3, wherein the base station controls in RRC dedicated signaling the UE to activate or deactivate a function of transmitting a proximity awareness message.

5. The method according to claim 4, wherein after the UE activates the function of transmitting a proximity awareness message as instructed by the base station, the UE broadcasts the proximity awareness message carrying the list and the temporary device identifier via an air interface so that a receiving UE receives the proximity awareness message via an air interface.

6. A method of configuring a receiving User Equipment (UE) for proximity awareness, the method comprising:
receiving and storing, by a network side device, subscription information of a UE transmitted by a Home Subscriber Server (HSS), wherein the subscription information carries respective types of services to which the UE subscribes;
determining, by the network side device, a filter template of service identifiers corresponding to the respective types of services to which the UE subscribes according to a preset mapping relationship between the service identifiers and the types of services, wherein the filter template of service identifiers is configured to filter respective service identifiers carried in a proximity awareness message received by the UE via an air interface, and the filter template of service identifiers comprises at least a list of service identifiers; and transmitting, by the network side device, the filter template of service identifiers to a base station so that the base station configures the UE with the filter template of service identifiers.

7. The method according to claim 6, wherein after the network side device transmits the filter template of service identifiers to the base station, the method further comprises:
configuring, by the base station, the UE with the filter template of service identifiers in Radio Resource Control (RRC) dedicated signaling.

8. The method according to claim 7, wherein the base station controls in RRC dedicated signaling the UE to activate or deactivate a function of receiving a proximity awareness message.

9. The method according to claim 8, wherein after the UE activates the function of receiving a proximity awareness message as instructed by the base station, the UE receives via an air interface a proximity awareness message, which carries a list of service identifiers and a temporary device identifier, broadcast by a transmitting UE via an air interface.

10. The method according to claim 9, wherein the UE receiving via the air interface the proximity awareness message, which carries the list of service identifiers and the temporary device identifier, broadcast by the transmitting UE via the air interface comprises:
filtering, by an access layer of the UE, the respective service identifiers carried in the received proximity awareness message according to the configured filter template of service identifiers and then notifying an application layer of the UE.

11. The method according to claim 6, the method further comprising:
receiving, by the network side device, a first service information inquiry request, which carries a service identifier to be inquired about and a temporary device identifier of a transmitting UE, transmitted by the receiving UE;
determining, by the network side device, a permanent identifier corresponding to the temporary device identifier of the transmitting UE according to a mapping relationship between the temporary device identifier and the permanent identifier and transmitting a second service information inquiry request which carries the service identifier to be inquired about and the permanent identifier to a Home Subscriber Server (HSS); and
receiving, by the network side device, service information returned by the HSS and transmitting the service information to the receiving UE.

12. The method according to claim 11, wherein after transmitting the second service information inquiry request which carries the service identifier to be inquired about and the permanent identifier to the HSS, the method further comprises:
inquiring, by the HSS, a correspondence relationship between a permanent identifier and subscription data of the UE, determining the subscription data corresponding to the permanent identifier carried in the second service information inquiry request, obtaining service information corresponding to the service identifier carried in the second service information inquiry request from the subscription data and returning the service information to the network side device by carrying it in a service information indication message, the service information indication message further carries the permanent identifier and the service identifier.

13. The method according to claim 12, wherein after the network side device receives the service information indication message returned by the HSS, the method further comprises:
replacing, by the network side device, the permanent identifier carried in the service information indication message with the temporary device identifier of the transmitting UE and transmitting the updated service information indication message to the receiving UE.

14. The method according to claim 11, wherein after the network side device receives the first service information inquiry request and before the network side device transmits the second service information inquiry request to the HSS, the method further comprises: determining, by the network side device, from subscription information of the receiving UE that the receiving UE subscribes to a function of inquiring about service information.

15. The method according to claim 6, the method further comprising:
receiving, by a first network side device which serves the receiving UE, a first service information inquiry request, which carries a service identifier to be inquired about and a temporary device identifier of a transmitting UE, transmitted by the receiving UE;
determining, by the first network side device, a second network side device which serves the transmitting UE according to identifier information of a network side device included in the temporary device identifier of the transmitting UE and forwarding the first service information inquiry request to the second network side device; and
determining, by the second network side device, a permanent identifier corresponding to the temporary device identifier of the transmitting UE according to a mapping relationship between the temporary device identifier and the permanent identifier, transmitting a second service information inquiry request which carries the service identifier to be inquired about and the permanent identifier to a Home Subscriber Server (HSS), and receiving the service information obtained by the HSS in response to the second service information inquiry request and then transmitting the service information to the receiving UE through the first network side device.

16. The method according to claim 15, wherein after transmitting the second service information inquiry request carrying the service identifier to be inquired about and the permanent identifier to the HSS, the method further comprises:
determining, by the HSS, subscription data of the transmitting UE according to the permanent identifier of the transmitting UE carried in the second service information inquiry request, obtaining service information corresponding to the service identifier carried in the second service information inquiry request from the subscription data and returning the service information to the second network side device by carrying it in a service information indication message, the service information indication message further carries the permanent identifier and the service identifier.

17. The method according to claim 16, wherein after the network side device receives the service information indication message returned by the HSS, the method further comprises:
replacing, by the second network side device, the permanent identifier carried in the service information indication message with the temporary device identifier of the transmitting UE and then transmitting the updated service information indication message to the first network side device.

18. The method according to claim 15, wherein after the first network side device receives the first service information inquiry request and before the first network side device forwards the second service information inquiry request to the second network side device, the method further comprises: determining from subscription information of the receiving UE that the receiving UE subscribes to a function of inquiring about service information.

19. A network side device, comprising:
at least one processor; and
a memory communicably connected with the at least one processor for storing instructions executable by the at least one processor,
wherein execution of the instructions by the at least one processor causes the at least one processor to:
receive and store subscription information of a User Equipment (UE) transmitted by a Home Subscriber Server (HSS), wherein the subscription information carries respective types of services to which the UE subscribes;
determine a list of service identifiers of the respective types of services to which the UE subscribes according to a preset mapping relationship between the service identifiers and the types of services and to allocate a temporary device identifier to the UE; and
transmit the list and the temporary device identifier to a base station so that the base station configures the UE with the list and the temporary device identifier.

20. A network side device, comprising:
At least one processor, and
a memory communicably connected with the at least one processor for storing instructions executable by the at least one processor,
wherein execution of the instructions by the at least one processor causes the at least one processor to:
receive and store subscription information of a User Equipment (UE) transmitted by a Home Subscriber Server (HSS), wherein the subscription information carries respective types of services to which the UE subscribes;
determine a filter template of service identifiers corresponding to the respective types of services to which the UE subscribes according to a preset mapping relationship between the service identifiers and the types of services, wherein the filter template of service identifiers is configured to filter respective service identifiers carried in a proximity awareness message received by the UE via an air interface, and the filter template of service identifiers comprises at least a list of service identifiers; and
transmit the filter template of service identifiers to a base station, which configures the UE with the filter template of service identifiers.

* * * * *